(12) United States Patent
Tena Han et al.

(10) Patent No.: US 10,870,396 B2
(45) Date of Patent: Dec. 22, 2020

(54) APPARATUS AND METHOD FOR STORING AN UMBRELLA IN A MOTOR VEHICLE

(71) Applicant: FORD GLOBAL TECHNOLOGIES, LLC, Dearborn, MI (US)

(72) Inventors: Luis Adrian Tena Han, Tlalnepantla de Baz (MX); Carmen Frida Vargas Garcia, Cuautitlan Izcalli (MX)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 16/270,769

(22) Filed: Feb. 8, 2019

(65) Prior Publication Data
US 2020/0254938 A1 Aug. 13, 2020

(51) Int. Cl.
B60R 7/12 (2006.01)
B60R 7/04 (2006.01)

(52) U.S. Cl.
CPC . B60R 7/12 (2013.01); B60R 7/04 (2013.01)

(58) Field of Classification Search
CPC ...................................................... B60R 7/12
USPC ........................................................ 296/37.8
See application file for complete search history.

(56) References Cited

U.S. PATENT DOCUMENTS

| 3,081,126 | A | * | 3/1963 | Theberge | B60R 7/12 296/37.1 |
| 4,700,848 | A | * | 10/1987 | Fujiki | A45B 25/28 211/63 |
| 4,807,920 | A | | 2/1989 | Fujiki et al. | |
| 8,511,733 | B2 | | 8/2013 | Blackmore et al. | |
| 2004/0041425 | A1 | * | 3/2004 | Collavo | B60R 7/12 296/37.8 |
| 2004/0084922 | A1 | * | 5/2004 | Park | B60R 7/046 296/37.13 |
| 2004/0154953 | A1 | * | 8/2004 | Ravikumar | B60R 7/12 206/525 |
| 2005/0173483 | A1 | * | 8/2005 | Ravikumar | B60R 7/12 224/483 |
| 2006/0028043 | A1 | * | 2/2006 | Zeidman | B60R 7/12 296/37.13 |
| 2007/0241582 | A1 | | 10/2007 | McKeever | |
| 2009/0001749 | A1 | | 1/2009 | Johnson et al. | |

(Continued)

FOREIGN PATENT DOCUMENTS

| JP | 2008296651 A | 12/2008 |
| JP | 2015020627 A | 2/2015 |
| KR | 19980041129 U | 9/1998 |

OTHER PUBLICATIONS

English Machine Translation of JP2008296651A dated Dec. 11, 2008.

(Continued)

Primary Examiner — Jason S Morrow
(74) Attorney, Agent, or Firm — David Coppiellie; King & Schickli, PLLC

(57) ABSTRACT

An apparatus for holding an article such as an umbrella includes a housing having a receiver, a sidewall and a guideway on the sidewall. The apparatus also includes a plunger held in the receiver and displaceable between a first position and a second position. The plunger includes a follower that slides along the guideway. A method of releasing an umbrella from a receiver in a housing held in a motor vehicle component is also provided.

17 Claims, 13 Drawing Sheets

(56) References Cited

U.S. PATENT DOCUMENTS

2013/0057012 A1* 3/2013 Blackmore ............ B60K 37/04
                                                        296/37.13
2014/0361568 A1* 12/2014 Marchetti .............. B60K 37/00
                                                        296/37.12
2015/0130207 A1* 5/2015 Bisson .................... B60R 11/00
                                                         296/37.1

OTHER PUBLICATIONS

English Machine Translation of JP2015020627A dated Feb. 2, 2015.
English Machine Translation of KR19980041129U dated Sep. 15, 1998.

* cited by examiner

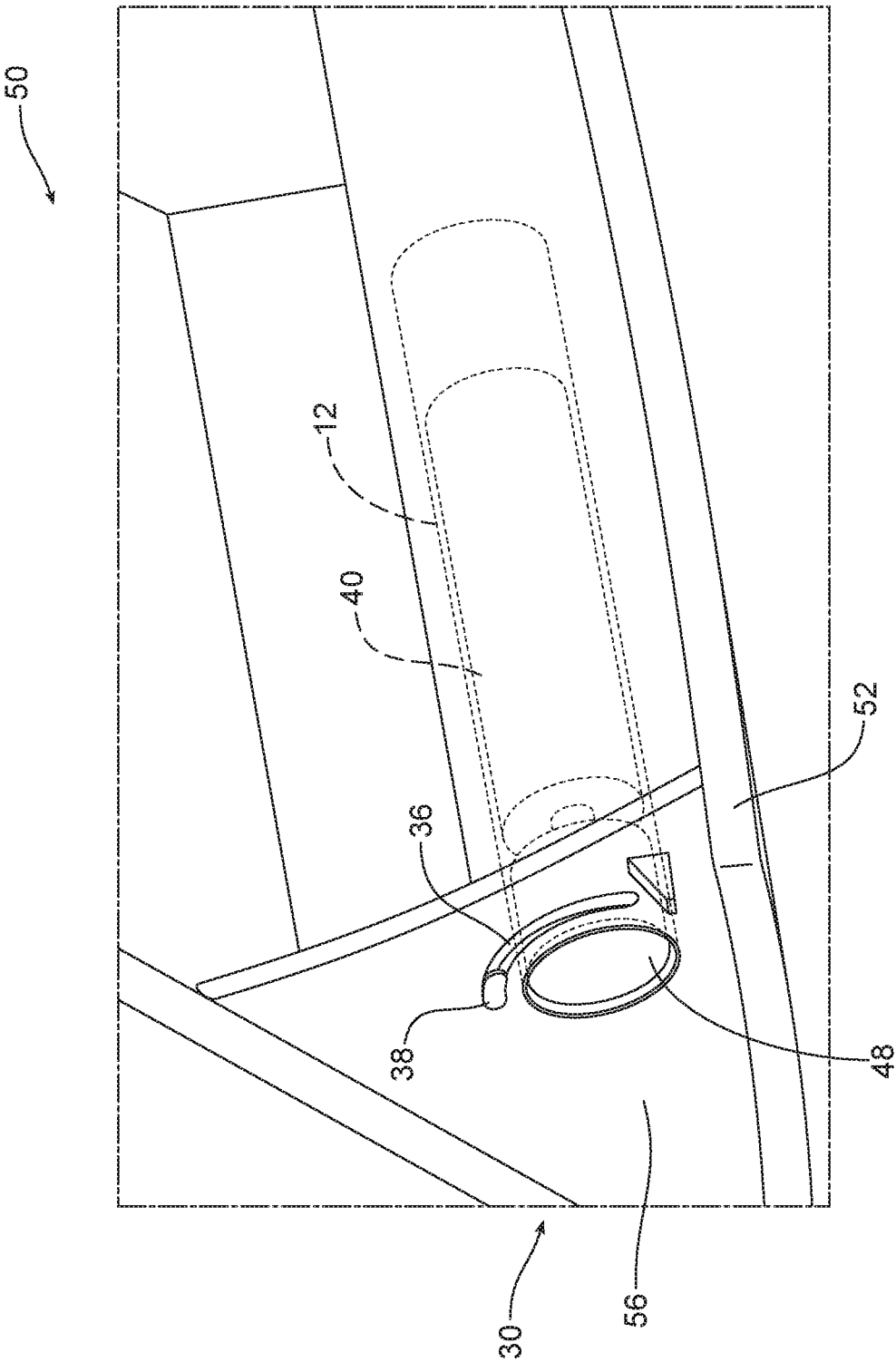

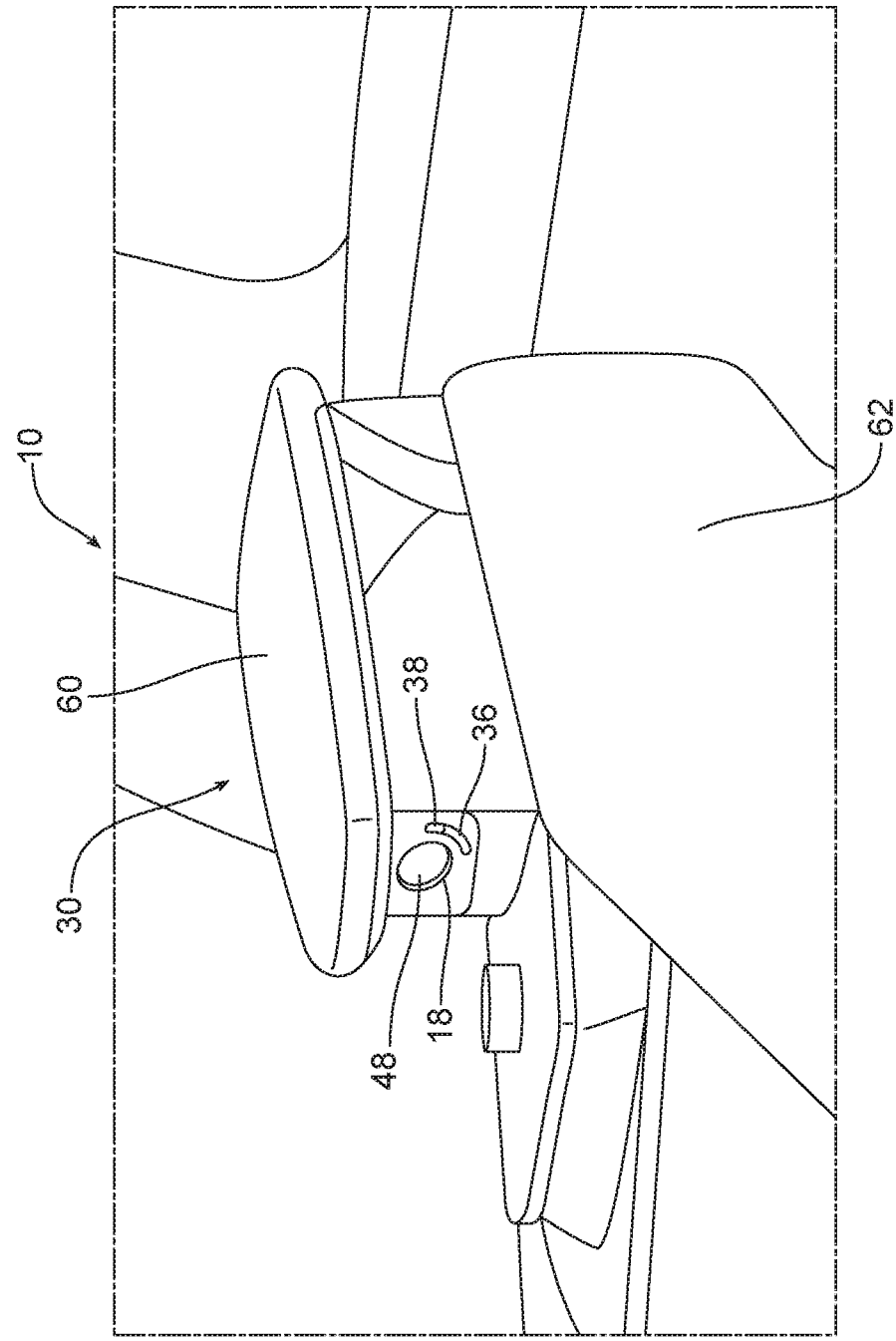

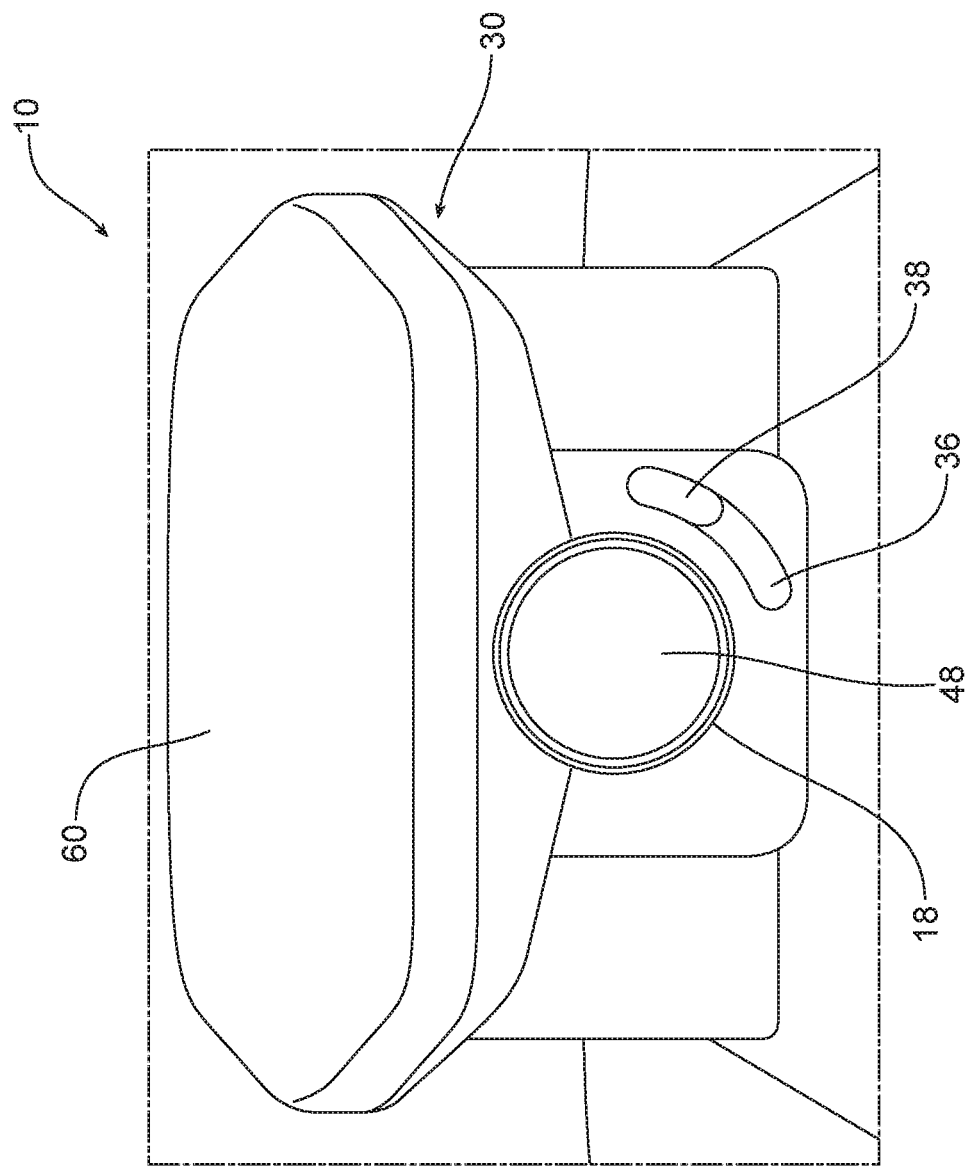

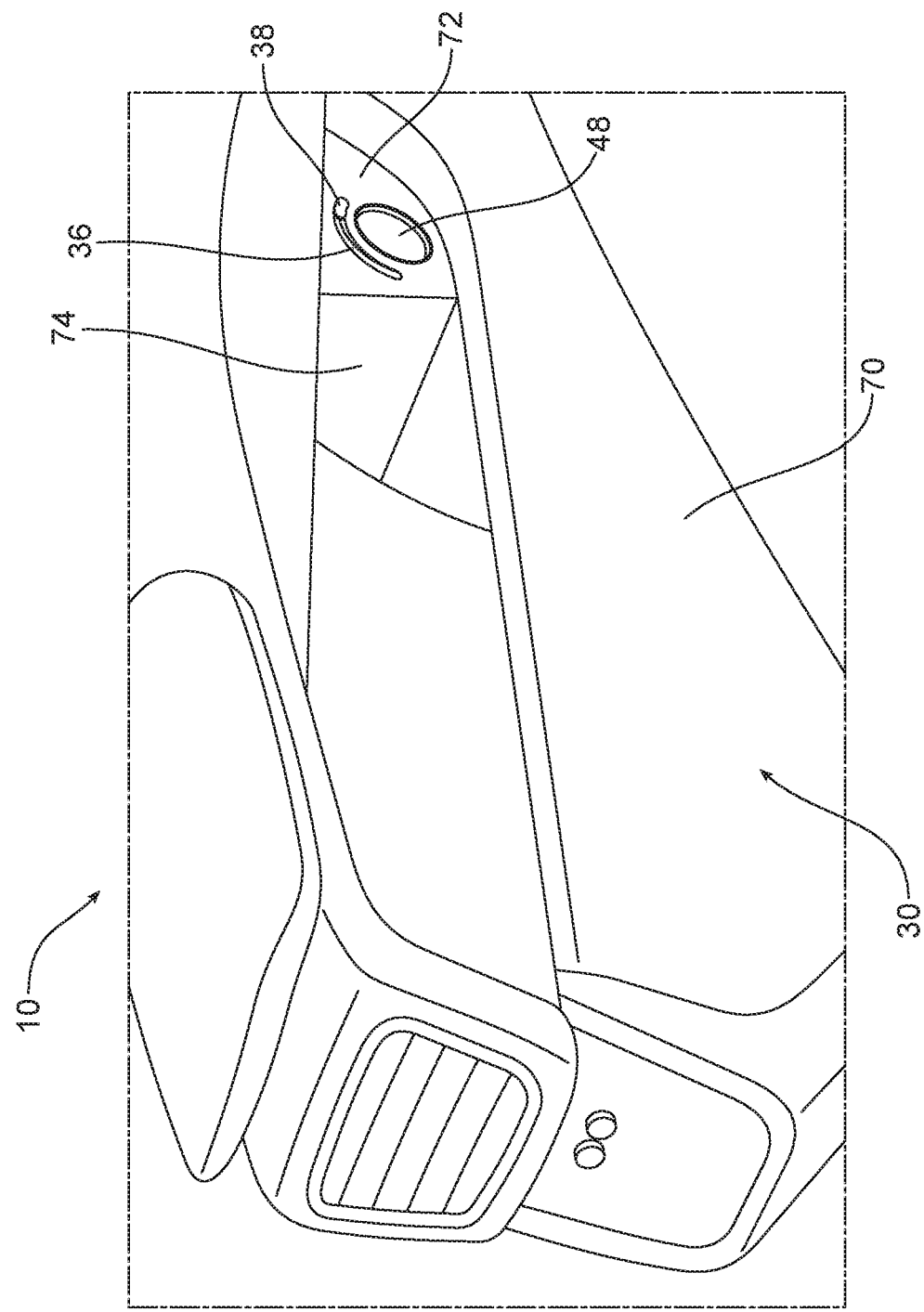

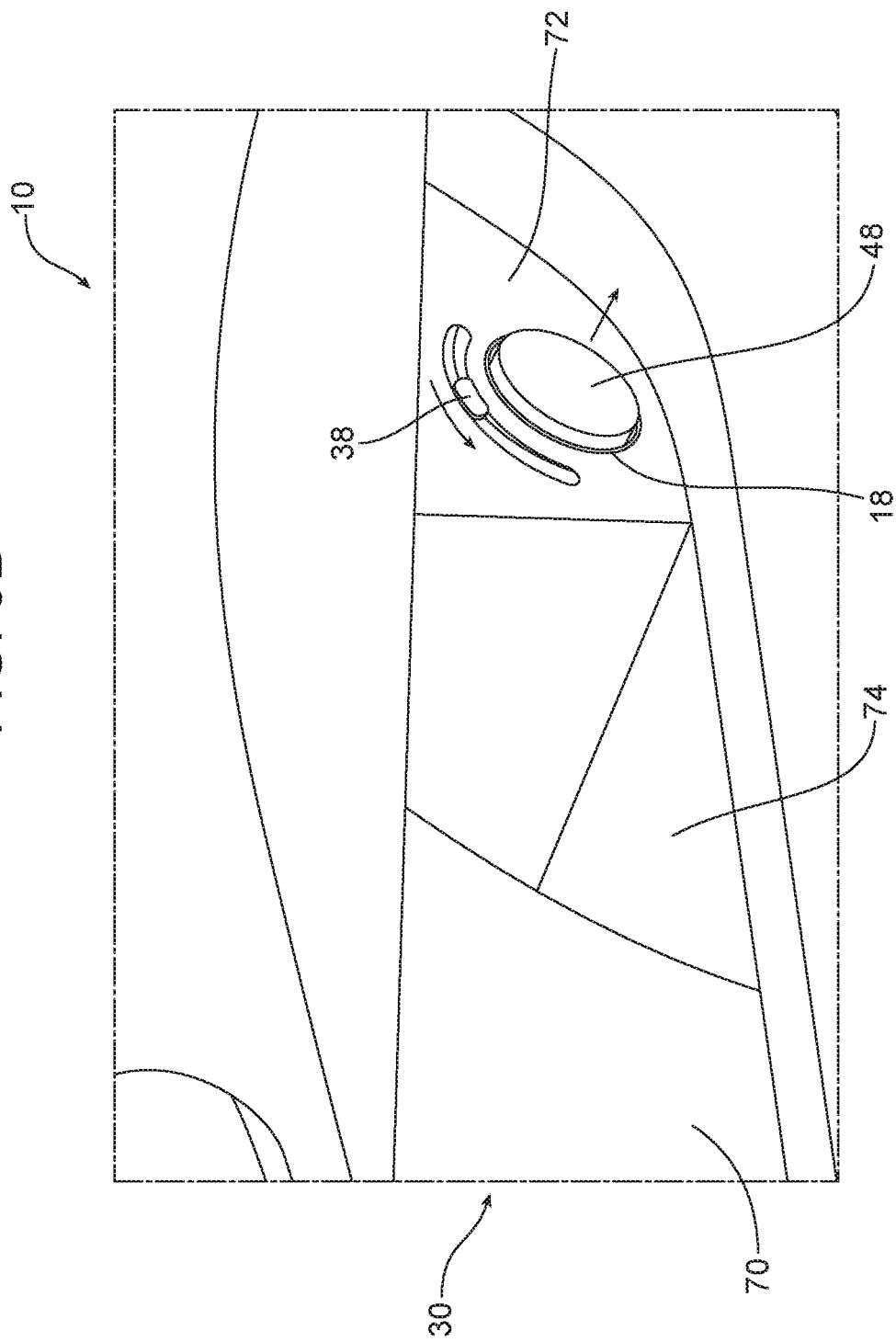

APPARATUS AND METHOD FOR STORING AN UMBRELLA IN A MOTOR VEHICLE

TECHNICAL FIELD

This document relates to a new and improved apparatus and method for storing an umbrella in a motor vehicle and more particularly to such an apparatus integrated into a motor vehicle component.

BACKGROUND

Many motor vehicle operators carry a compact umbrella in the motor vehicle so as to be available in the event of precipitation including, for example, unexpected rain showers. This document relates to a new and improved apparatus specifically adapted and configured to conveniently store a compact umbrella. Advantageously, the apparatus may be integrated into a motor vehicle component such as, for example, a headrest, an armrest, a center console, or even a facing behind a glovebox door. Advantageously, this allows one to store the compact umbrella in an easily accessed position where it will not be free to roll around the interior of the motor vehicle and possibly distract the motor vehicle operator.

SUMMARY

In accordance with the purposes and benefits described herein, a new and improved adaptor for holding an umbrella or the like comprises a housing having (a) a receiver, (b) a sidewall and (c) a guideway on the sidewall. The apparatus also includes a plunger held in the receiver. The plunger is displaceable between a first position and a second position. Further, the plunger includes a follower that slides along the guideway.

The housing may be cylindrical in shape. The guideway may be a helical guide track in the sidewall. The plunger may be circular in profile and concentrically received in the receiver within the sidewall. The follower may be two opposed tabs received in the helical guide track.

The housing may be held in a motor vehicle component. An elongated guide track may be carried on the motor vehicle component. The follower may engage in that elongated guide track. The receiver may have a first longitudinal axis and the elongated guide track may have a second longitudinal axis wherein the first longitudinal axis is parallel to the second longitudinal axis. Further, the receiver may include an access opening in an end of the sidewall.

The apparatus may further include an actuator projecting from the end of the sidewall adjacent the access opening. In one or more of the many possible embodiments, the motor vehicle component may include a housing receiver and an actuator receiver. The housing is received and held in the housing receiver. The actuator is received in and extends through the actuator receiver. That actuator receiver may extend in an arc concentrically around the housing receiver.

The apparatus may further include an umbrella releasably held in the receiver.

In one or more of the many possible embodiments of the apparatus, the motor vehicle component may be a headrest. In one or more of the many possible embodiments of the apparatus, the motor vehicle component may be an armrest. That armrest may be a pivoting lid of a center console storage compartment.

In one or more of the many possible embodiments of the apparatus, the motor vehicle component may be a facing hidden behind a glovebox door when that glove box door is closed. In one or more of the many possible embodiments of the apparatus, the motor vehicle component may be a center console.

In accordance with an additional aspect, a new and improved method is provided for releasing an umbrella from a receiver in a housing held in a motor vehicle component. That method comprises the steps of (a) engaging an actuator to rotate the housing in the motor vehicle component and (b) displacing a displaceable plunger in the receiver from a first position to a second position whereby the umbrella is pushed from the receiver in the housing. Still further the method may include the step of driving the displaceable plunger along a helical guide track in a sidewall of the housing as the plunger is displaced from the first position to the second position toward an access opening in an end of the housing.

In the following description, there are shown and described several preferred embodiments of the apparatus and the related method of releasing an umbrella from a receiver in a housing held in a motor vehicle component. As it should be realized, the apparatus and method are capable of other, different embodiments and their several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof.

FIG. 7B illustrates a glovebox compartment with the glovebox door open to allow access to the apparatus provided in a facing behind the glovebox door.

FIGS. 8A-8C illustrate an alternative embodiment of the apparatus wherein the housing is provided in an armrest that is pivotally attached to the center console of a motor vehicle.

More particularly, FIG. 8A illustrates the armrest in a first or home position.

Figure 8B:
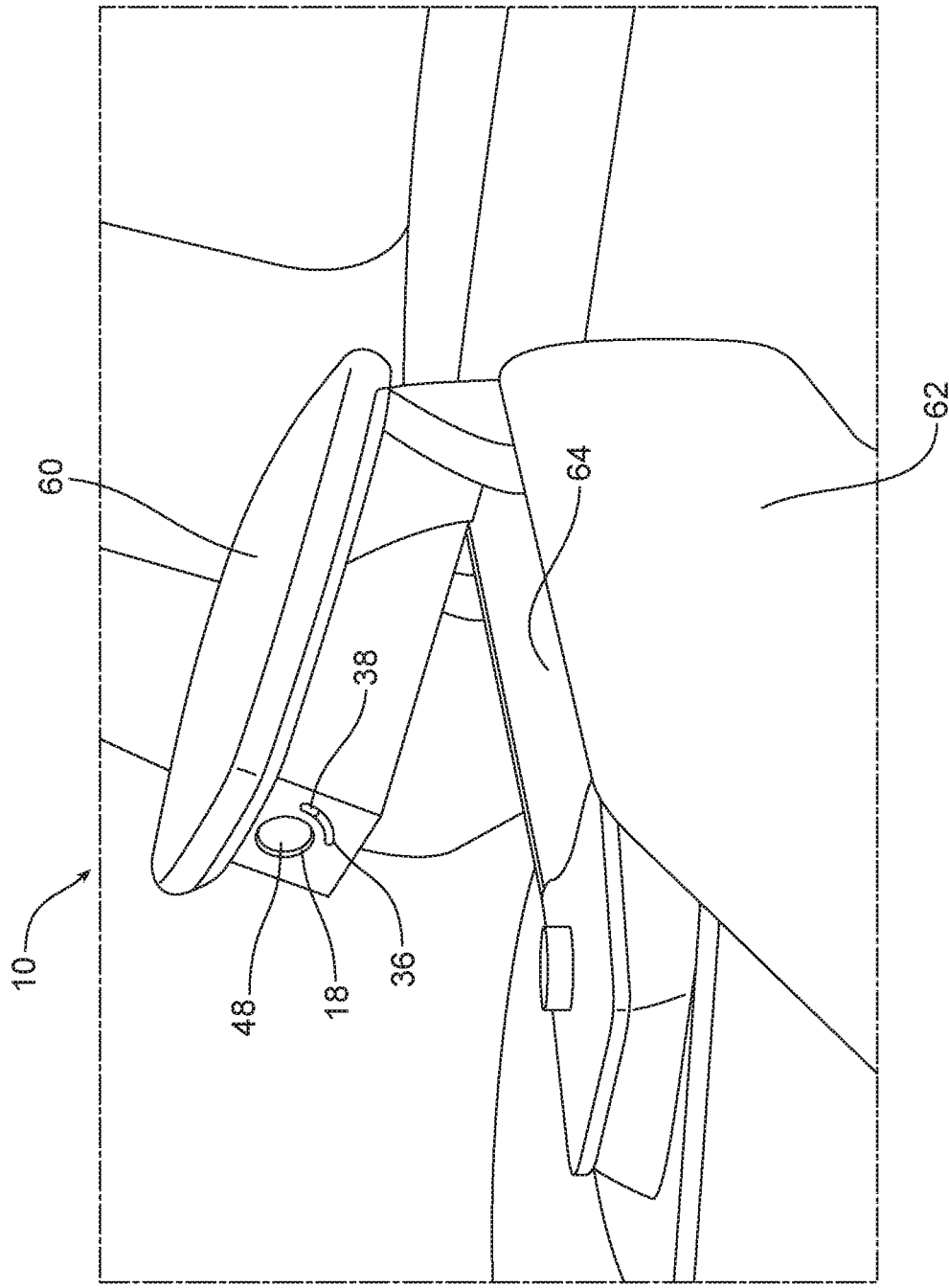

FIG. 8B illustrates the armrest in a second or raised position allowing access to the underlying storage compartment in a center console. FIG. 8C is a detailed front elevational view of the armrest illustrating the access opening, the actuator receiver and the actuator utilized to rotate the housing within the armrest.

FIGS. 9A and 9B illustrate yet another possible embodiment of the apparatus wherein the housing is provided in the center console adjacent a storage compartment.

FIG. 9A illustrates the apparatus holding the umbrella wherein the plunger is in the first position.

FIG. 9B illustrates how the actuator is rotated to displace the plunger toward the second position and force the end of the umbrella from the access opening at the end of the housing where one may grab the handle of the umbrella in order to remove the umbrella for use.

Reference will now be made in detail to the present preferred embodiments of the apparatus and method, examples of which are illustrated in the accompanying drawing figures.

DETAILED DESCRIPTION

Figure 1:
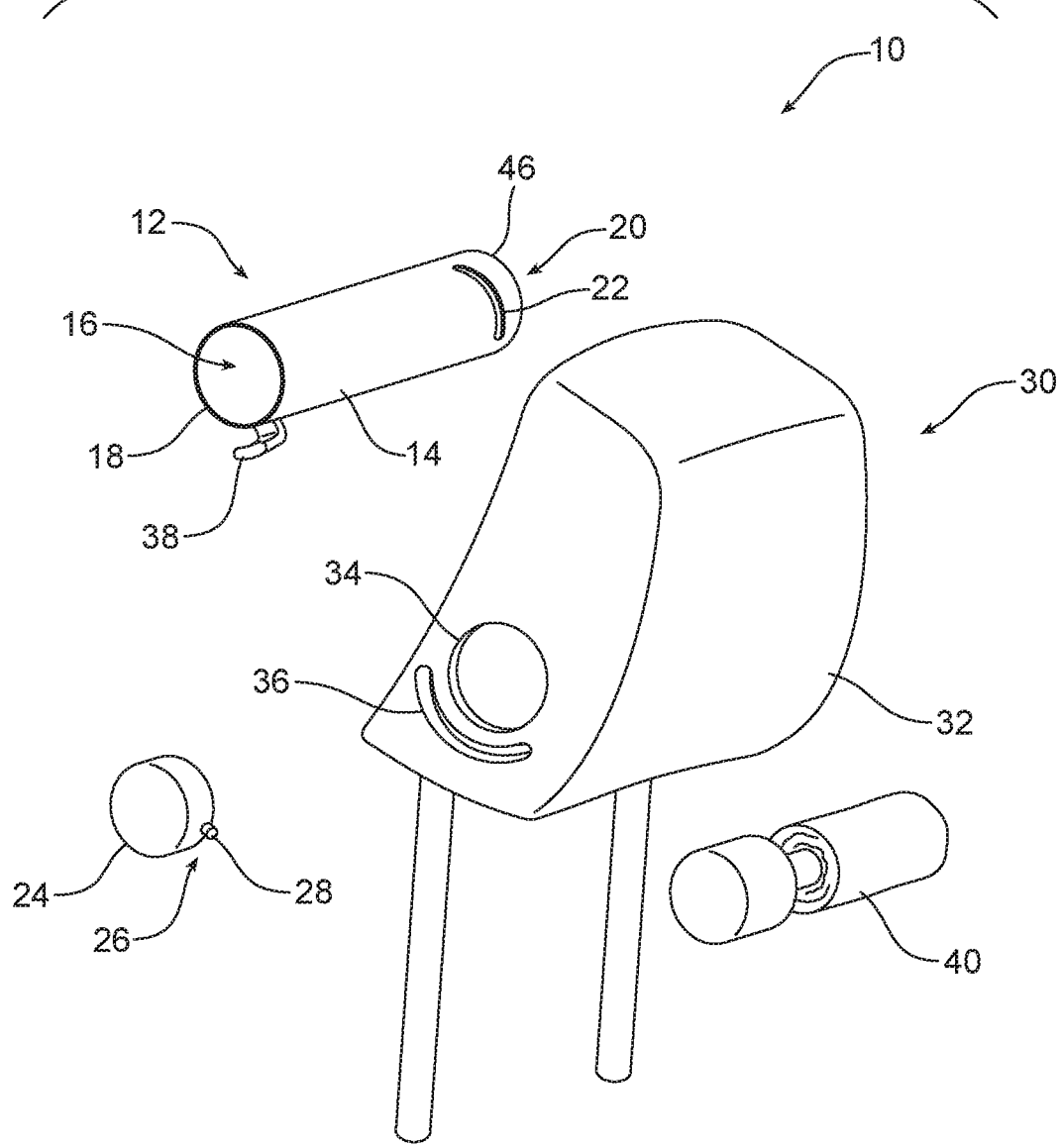
FIG. 1 is an exploded perspective view of a first possible embodiment of the apparatus.
Figure 2:
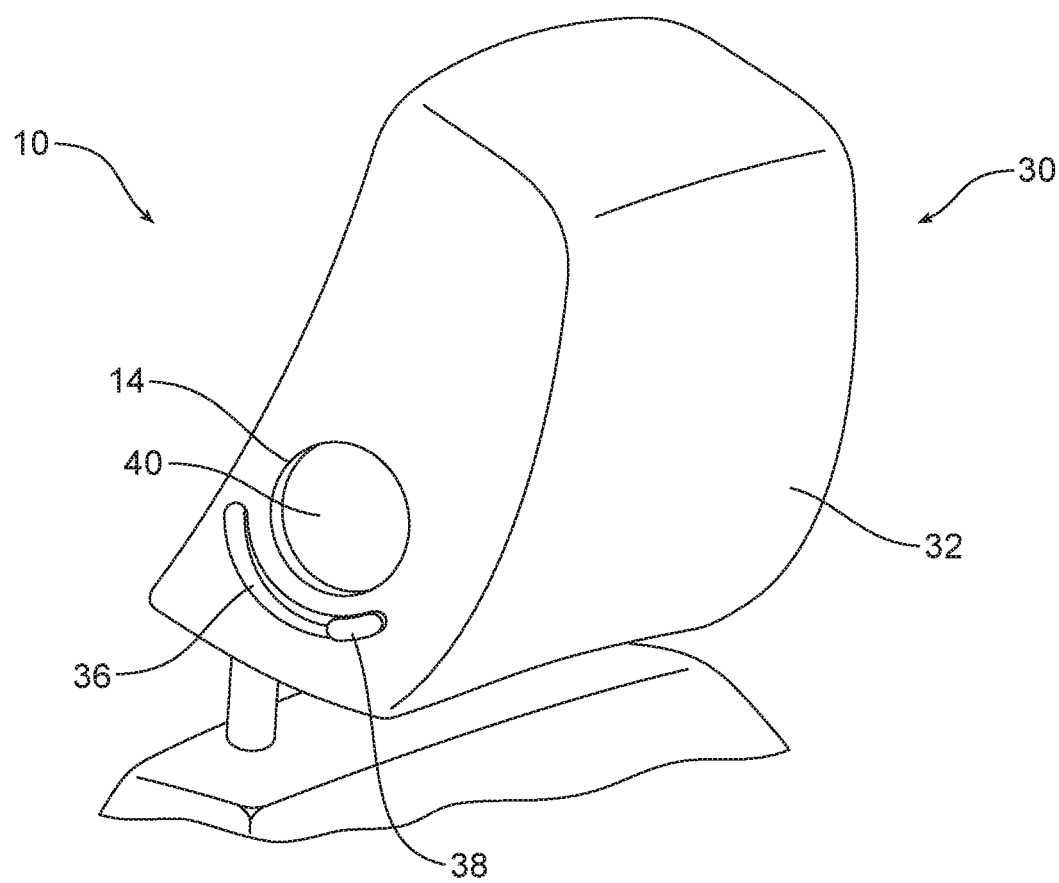
FIG. 2 is a perspective view of the apparatus of FIG. 1 in an assembled condition.
Figure 3:
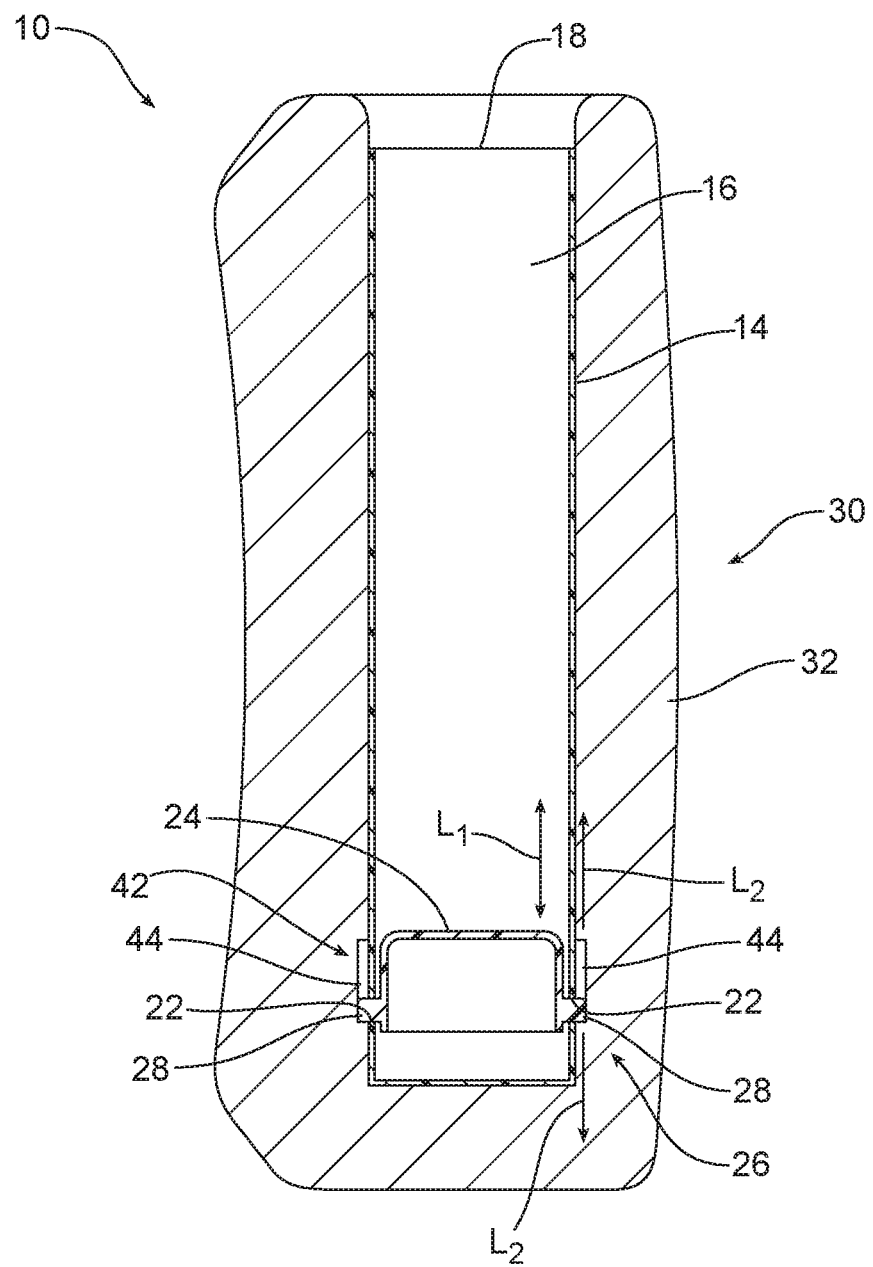
FIG. 3 is a longitudinal cross sectional view of the assembled apparatus of FIG. 2 without the umbrella.
Figure 4:
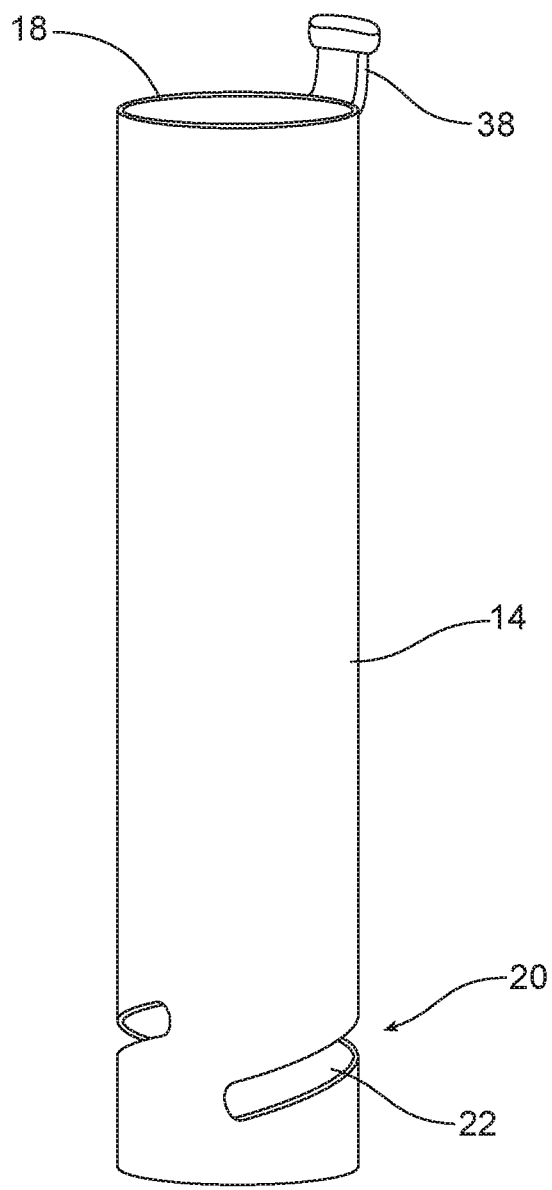
FIG. 4 is a detailed perspective view of the housing of the apparatus including the two ends of the helical guide track and the actuator projecting from the sidewall adjacent the access opening of the housing.

Reference is now made to FIGS. 1-5, 6A and 6B which illustrate a first possible embodiment of the apparatus 10 adapted to hold an umbrella 40 or other like-elongated object. As illustrated in FIG. 1, the apparatus 10 includes a housing 12 having a sidewall 14 defining a receiver 16. Receiver 16 has an access opening 18 at one end of the sidewall 14. A guideway 20 is provided on the sidewall 14. More particularly, in the illustrated embodiment, the housing 12 is cylindrical in shape and the guideway 20 is a helical guide track 22 provided in the sidewall 14. FIG. 4 provides a detailed view of the housing 12.

Figure 5:
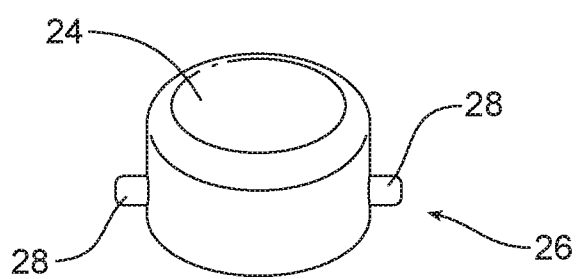
FIG. 5 is a detailed perspective view of the plunger, showing the follower in the form of two opposed tabs.
Figure 6A:
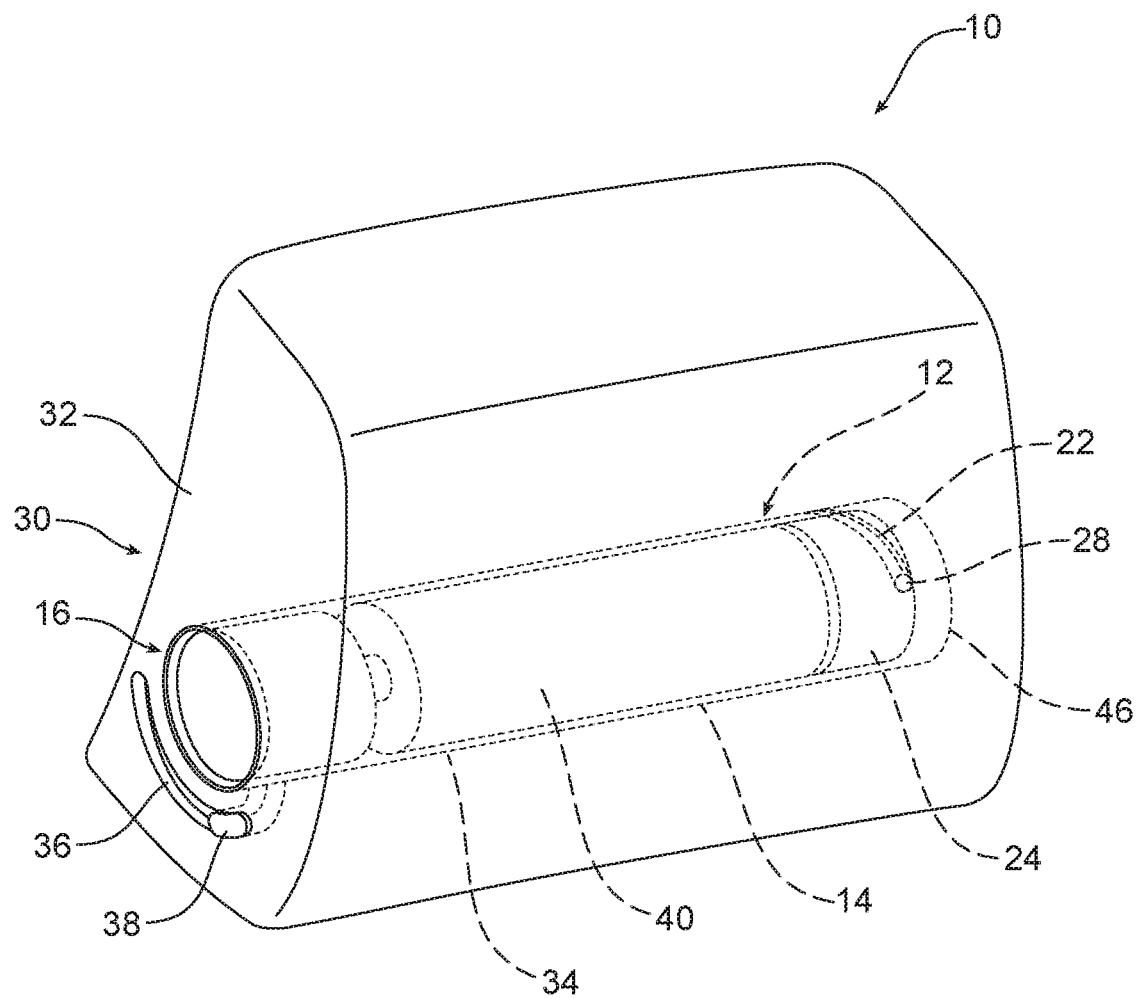
FIG. 6A is a perspective illustration of the assembled apparatus, illustrating how an umbrella held in the apparatus with the plunger being in the first or home position.
Figure 6B:
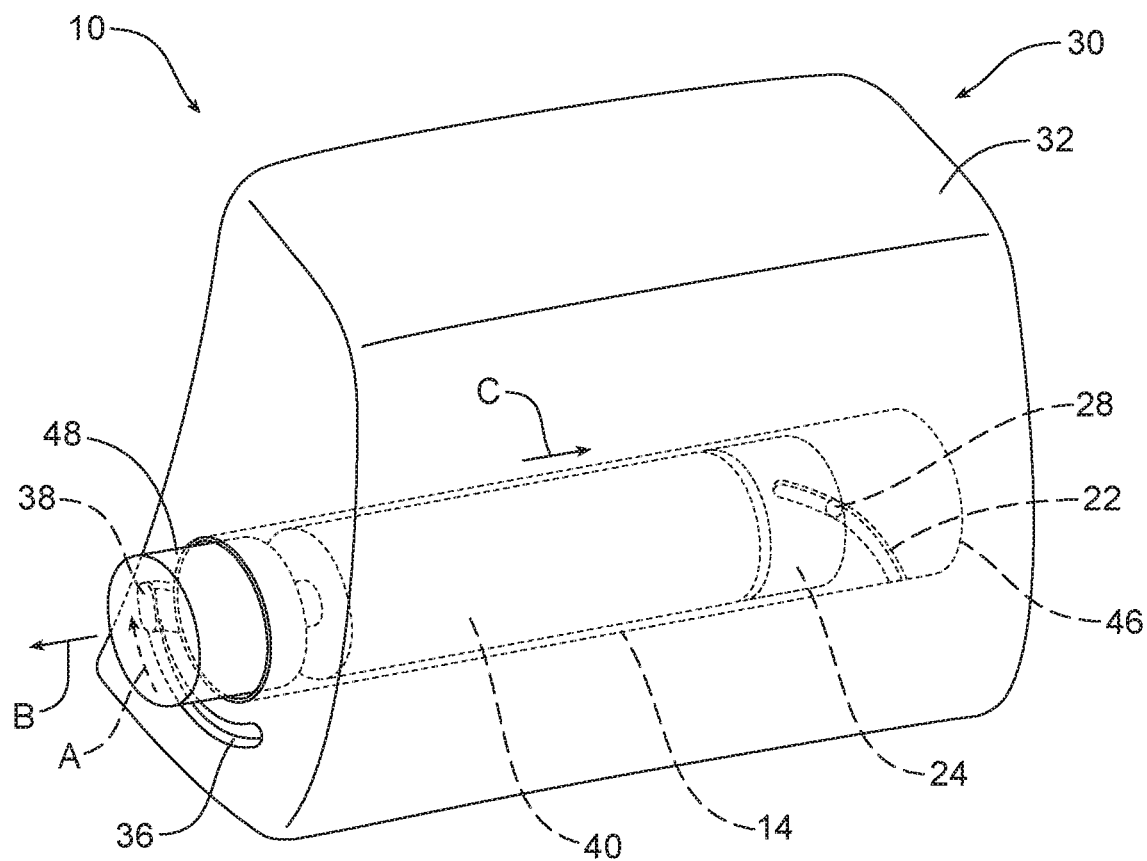
FIG. 6B is a view similar to FIG. 6A but illustrating the plunger in a second or extended position pushing the umbrella from the access opening at the end of the housing.

The apparatus 10 also includes a plunger 24 that is held in the receiver 16 and is displaceable between a first or home position illustrated in FIGS. 3 and 6A and a second or extended position illustrated in FIG. 6B. As should be appreciated, the plunger 24 is circular in profile and is concentrically held in the receiver 16 within the sidewall 14. The plunger 24 includes a follower 26 that slides along the guideway 20 thereby providing for limited axial displacement of the plunger within the receiver 16 of the housing 12. More particularly, in the illustrated embodiment, the follower 26 comprises two opposed tabs 28 that are received in the helical guide track 22. FIG. 5 provides a detailed perspective view of the plunger 24.

The housing 12 is held in a motor vehicle component 30. In the embodiment illustrated in FIGS. 1-5, 6A and 6B, that motor vehicle component 30 comprises a headrest 32. The motor vehicle component 30/headrest 32 includes a housing receiver 34 and an actuator receiver 36. An actuator 38 projects from the end of the sidewall 14 adjacent the access opening 18. The housing 12 is received in the housing receiver 34 and the actuator 38 is received and extends through the actuator receiver 36. In the illustrated embodiment, the actuator receiver 36 extends in an arc concentrically around the housing receiver 34. An umbrella 40 is releasably held in the receiver 16.

As best illustrated in FIG. 3, an elongated guide track 42, in the form of two opposed guide channels 44, is carried on the motor vehicle component 30/headrest 32. The opposed tabs 28 of the follower 26 extend completely through the helical guide track 22 and engage in the opposed channels 44 of the elongated guide track 42. In the illustrated embodiment, the receiver 16 has a first longitudinal axis $L_1$ and the elongated guide track has a second longitudinal axis $L_2$ wherein the first longitudinal axis is parallel to the second longitudinal axis.

Reference is now made to FIG. 6A wherein the plunger 24 is in the first position nearest to the closed end 46 of the receiver 16 and the umbrella 40 is completely received and held within the receiver. One may retrieve the umbrella 40 from the receiver 16 within the sidewall 14 of the housing 12 by engaging the actuator 38 and displacing the actuator in the direction of action arrow A along the length of the arcuate actuator receiver 36. See FIG. 6B. As the actuator 38 is displaced in the direction of action arrow A, the housing 12 is rotated within the housing receiver 34 in the motor vehicle component 30/headrest 32. At the same time, the housing 12 is being rotated with respect to the plunger 24 because plunger 24 is prevented from rotating with the housing 12 by engagement of the opposed tabs 28 in the elongated guide track 42 (and more particularly, the opposed channels 44 thereof) carried by or formed in the motor vehicle component 30/headrest 32.

As a result, the opposed tabs 28 of the follower 26 follow the helical guide track 22. This causes the plunger 24 to be displaced in the direction of action arrow B from the closed end 46 of the receiver 16 toward the access opening 18. As a result, the umbrella 40 is also pushed in the direction of action arrow B until the umbrella handle 48 is pushed outward from the access opening 18. As should be appreciated, the projecting handle 48 may then be easily grasped by the user and pulled to completely remove the umbrella 40 from the receiver 16 of the housing 12 for subsequent use.

One may return the umbrella 40 to the stowed position by engaging the actuator 38 and displacing it along the actuator receiver 36 into the position illustrated in FIG. 6A thereby displacing the plunger 24 back toward the first position adjacent the closed end 46 of the receiver 16. One then places the end of the umbrella in the access opening 18 and pushes the umbrella in the direction of action arrow C until it is fully received in the receiver 16 as illustrated in FIG. 6A.

Figure 7A:
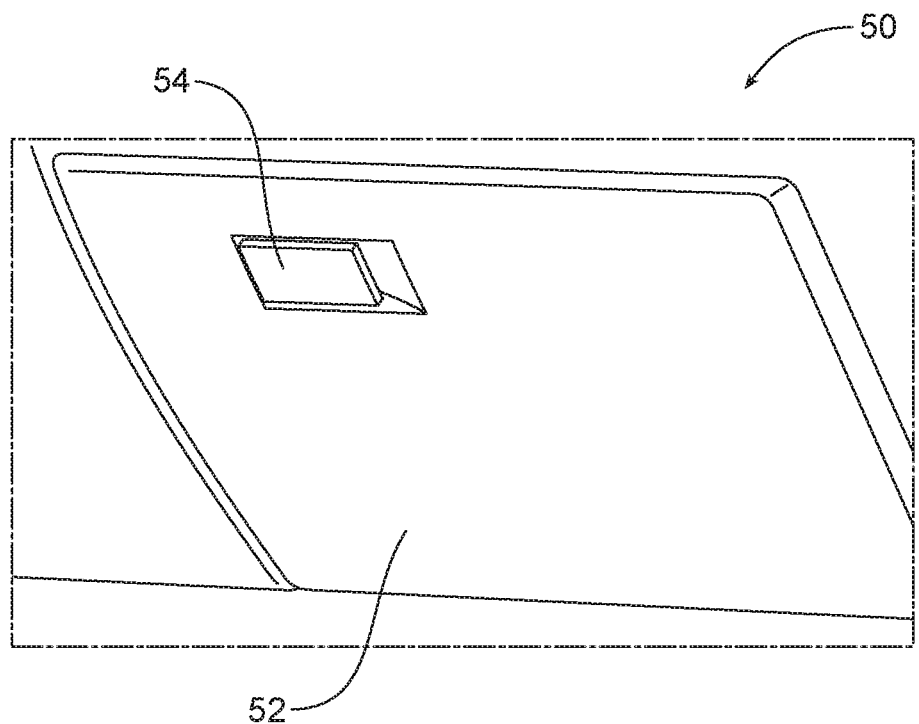
FIG. 7A illustrates a glovebox compartment with the glovebox door in the closed position.

In the embodiment illustrated in FIGS. 1-5, 6A and 6B, the motor vehicle component 30 comprises the headrest 32. Here it should be appreciated that a number of additional embodiments are possible. For example, FIG. 7A illustrates a glovebox assembly 50 including a glovebox door 52 having a latch release lever 54. One engages the latch release lever 54 to displace the glovebox door 52 from the closed position illustrated in FIG. 7A to the open position illustrated in FIG. 7B. In FIG. 7B, the motor vehicle component 30 comprises the facing 56 that is concealed behind the glovebox door 52 when the glovebox door is closed. Once the glovebox door 52 is opened, the actuator 38 may be accessed and manipulated in order to displace the handle 48 of the umbrella 40 from the housing 12 in the manner described above.

FIGS. 8A-8C illustrate yet another possible embodiment wherein the motor vehicle component 30 comprises an armrest 60. In the illustrated embodiment, the armrest 60 is pivotally connected to a center console 62 and may be pivoted upward to access an underlying storage compartment 64 in the center console. See FIG. 8B. As should be appreciated from reviewing FIGS. 8A-8C, the actuator 38 is easily accessible in any position and may be displaced along the actuator receiver 36 in order to extend the umbrella handle 48 through the access opening 18 from the receiver 16 as described above.

In the embodiment illustrated in FIGS. 9a and 9B, the motor vehicle component is a portion of the center console 70 such as a trim panel 72 adjacent the storage compartment 74. As should be appreciated, the actuator 38 is easily accessible from the side of the center console 70 where it may be displaced along the actuator receiver 36 in order to extend the umbrella handle 48 through the access opening 18 from the receiver 16 thereby allowing one to easily grasp the umbrella and pull the umbrella from the receiver for use. The umbrella 40 may then be returned to its stowed position in the manner previously described following use.

Any of the embodiments previously described and illustrated in FIGS. 1-9B are useful in a method of releasing an umbrella 40 from a receiver 16 in a housing 12 held in a motor vehicle component 30. That method includes the steps of (a) engaging an actuator 38 to rotate the housing 12 in the motor vehicle component 30 and displacing the displaceable plunger 24 in the receiver 16 from a first position to a second position whereby the umbrella 40 is pushed from the receiver in the housing. As explained above and best illustrated in FIGS. 6A and 6B, the method may further include the step of driving the displaceable plunger 24 along the helical guide track 22 in the sidewall 14 of the housing 12 as the plunger is displaced from the first position to the second position toward the access opening 18 in the end of the housing.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus, comprising:
   a motor vehicle component;
   a cylindrical housing, held in the motor vehicle component, having a sidewall, a receiver within the sidewall and a guideway on said sidewall wherein the guideway is a helical guide track in the sidewall;
   a plunger held in said receiver and displaceable between a first position and a second position, said plunger including a follower that slides along said guideway; and
   an elongated guide track carried on said motor vehicle component.

2. The apparatus of claim 1, wherein said plunger is circular in profile and concentrically received in said receiver within said sidewall.

3. The apparatus of claim 2, wherein said follower is two opposed tabs received in said helical guide track.

4. The apparatus of claim 1, wherein said follower engages in said elongated guide track.

5. The apparatus of claim 4, wherein said receiver has a first longitudinal axis and said elongated guide track has a second longitudinal axis wherein said first longitudinal axis is parallel to said second longitudinal axis.

6. The apparatus of claim 4, wherein said receiver includes an access opening at an end of said sidewall.

7. The apparatus of claim 6, further including an actuator projecting from said end of said sidewall adjacent said access opening.

8. The apparatus of claim 7, wherein (a) said motor vehicle component includes a housing receiver and an actuator receiver, (b) said housing is received and held in said housing receiver and (c) said actuator is received in and extends through said actuator receiver.

9. The apparatus of claim 8, wherein said actuator receiver extends in an arc concentrically around said housing receiver.

10. The apparatus of claim 9, further including an umbrella releasably held in said receiver.

11. The apparatus of claim 10, wherein said motor vehicle component is a head rest.

12. The apparatus of claim 10, wherein said motor vehicle component is an armrest.

13. The apparatus of claim 12, wherein said armrest is a pivoting lid of a center console storage compartment.

14. The apparatus of claim 10, wherein said motor vehicle component is a facing behind a glove box door.

15. The apparatus of claim 10, wherein said motor vehicle component is a center console.

16. A method of releasing an umbrella from a receiver in a housing held in a motor vehicle component, comprising:
    engaging an actuator to rotate said housing in said motor vehicle component; and
    displacing a displaceable plunger in said receiver from a first position to a second position whereby said umbrella is pushed by said displaceable plunger from said receiver in said housing.

17. The method of claim 16, further including driving said displaceable plunger along a helical guide track in a sidewall of said housing as said plunger is displaced from said first position to said second position toward an access opening in an end of said housing.

* * * * *